US011461219B2

(12) United States Patent
Hughes et al.

(10) Patent No.: US 11,461,219 B2
(45) Date of Patent: Oct. 4, 2022

(54) PRIORITIZING SOFTWARE BUG MITIGATION FOR SOFTWARE ON MULTIPLE SYSTEMS

(71) Applicant: Red Hat, Inc., Raleigh, NC (US)

(72) Inventors: Shannon Hughes, Holly Springs, NC (US); Brian Michael Hamrick, Fuquay Varina, NC (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/165,437

(22) Filed: Feb. 2, 2021

(65) Prior Publication Data
US 2022/0245050 A1 Aug. 4, 2022

(51) Int. Cl.
G06F 11/36 (2006.01)
G06F 11/30 (2006.01)
G06F 11/34 (2006.01)

(52) U.S. Cl.
CPC ........ G06F 11/362 (2013.01); G06F 11/3082 (2013.01); G06F 11/3452 (2013.01); G06F 11/3664 (2013.01)

(58) Field of Classification Search
CPC ............... G06F 11/362; G06F 11/3082; G06F 11/3452; G06F 11/3664
USPC ................................................. 717/124–140
See application file for complete search history.

(56) References Cited

U.S. PATENT DOCUMENTS

| 5,319,645 | A  | * | 6/1994 | Bassi   | G06F 11/3664 |
|           |    |   |        |         | 714/E11.21   |
| 5,630,047 | A  | * | 5/1997 | Wang    | G06F 11/1479 |
|           |    |   |        |         | 714/E11.13   |
| 6,742,141 | B1 | * | 5/2004 | Miller  | G06F 11/366  |
|           |    |   |        |         | 714/E11.212  |
| 7,430,670 | B1 | * | 9/2008 | Horning | G06F 21/125  |
|           |    |   |        |         | 713/190      |

(Continued)

FOREIGN PATENT DOCUMENTS

CN          109918100 A       6/2019

OTHER PUBLICATIONS

Bojanova et al, "Classifying Memory Bugs Using Bugs Framework Approach", IEEE, pp. 1157-1164 (Year: 2021).*

(Continued)

*Primary Examiner* — Anil Khatri
(74) *Attorney, Agent, or Firm* — Kilpatrick Townsend & Stockton LLP

(57) ABSTRACT

A prioritization for bugs in software on multiple systems can be determined. For example, a computing system can receive data files that each describe system characteristics for a client device of multiple client devices. The computing system can compare each data file to a plurality of rules to identify one or more matches between the data file and the plurality of rules. The computing system can filter the matches to generate a subset of the one or more matches that are associated with metadata tags corresponding to bugs in the multiple client devices. The computing system can aggregate the subset of the one or more matches for the (Continued)

multiple client devices to determine a number of the multiple client devices associated with each bug. The computing system can determine a prioritization for addressing the bugs based on the number of the multiple client devices associated with each bug.

20 Claims, 3 Drawing Sheets

(56) References Cited

U.S. PATENT DOCUMENTS

| | | | | |
|---|---|---|---|---|
| 7,779,390 | B1* | 8/2010 | Allavarpu | G06F 11/362 717/124 |
| 7,877,642 | B2* | 1/2011 | Ding | G06F 16/23 717/133 |
| 7,996,723 | B2 | 8/2011 | Levine et al. | |
| 8,473,919 | B2* | 6/2013 | Cutler | G06F 11/366 717/124 |
| 8,910,120 | B2* | 12/2014 | Srinivasa | G06F 16/00 717/124 |
| 9,223,679 | B1* | 12/2015 | Ho | G06F 11/321 |
| 10,108,526 | B2* | 10/2018 | Sisman | G06F 11/362 |
| 10,346,287 | B1* | 7/2019 | Dillon | G06F 11/362 |
| 10,467,132 | B1 | 11/2019 | Chatterjee et al. | |
| 10,528,454 | B1 | 1/2020 | Baraty et al. | |
| 10,740,216 | B1* | 8/2020 | Parent | G06N 20/20 |
| 10,949,338 | B1* | 3/2021 | Sirianni | G06F 11/3692 |
| 11,194,564 | B1* | 12/2021 | Dwivedi | G06F 8/65 |
| 11,263,229 | B1* | 3/2022 | Basavaiah | G06F 16/2477 |
| 2015/0363197 | A1 | 12/2015 | Carback et al. | |

OTHER PUBLICATIONS

Asadollah et al, "Runtime Verification for Detecting Suspension Bugs in Multicore and Parallel Software", IEEE, pp. 77-80 (Year: 2017).*

Kashiwa, "RAPTOR: Release-Aware and Prioritized Bug-fixing Task assignment Optimization", IEEE, pp. 629-633 (Year: 2019).*

Hossain et al, "Risk Identification and Mitigation Processes for Using Scrum in Global Software Development: A Conceptual Framework", IEEE, pp. 457-464 (Year: 2009).*

Abhishek et al, "BuDDI: Bug Detection, Debugging, and Isolation Middlebox for Software-Defined Network Controllers", IEEE, pp. 307-311 (Year: 2016).*

Liang et al, "Understanding and Detecting Performance and Security Bugs in IOT OSes", IEEE, pp. 1-6 (Year: 2016).*

Zhang et al, "A Bug Rule based Technique with Feedback for Classifying Bug Reports", IEEE, pp. 336-343 (Year: 2011).*

"Automatic Bug Reporting Tool (ABRT)," Red Hat, Inc., 2021, https://access.redhat.com/documentation/en-us/red_hat_enterprise_linux/7/html/system_administrators_guide/ch-abrt.

* cited by examiner

PRIORITIZING SOFTWARE BUG MITIGATION FOR SOFTWARE ON MULTIPLE SYSTEMS

TECHNICAL FIELD

The present disclosure relates generally to software development. More specifically, but not by way of limitation, this disclosure relates to prioritizing software bug mitigation for software on multiple systems.

BACKGROUND

Software bugs are errors or flaws in software applications that produce undesired or unexpected results. To identify these bugs, software developers or engineers may analyze error cases generated by users. A greater number of error cases associated with a bug can indicate more users are affected by the bug. Once identified, the software developers or engineers can attempt to fix the bugs, but fixing the bugs may be time-intensive. Thus, bugs can be prioritized based on their perceived impact to users.

DETAILED DESCRIPTION

Figure 1:
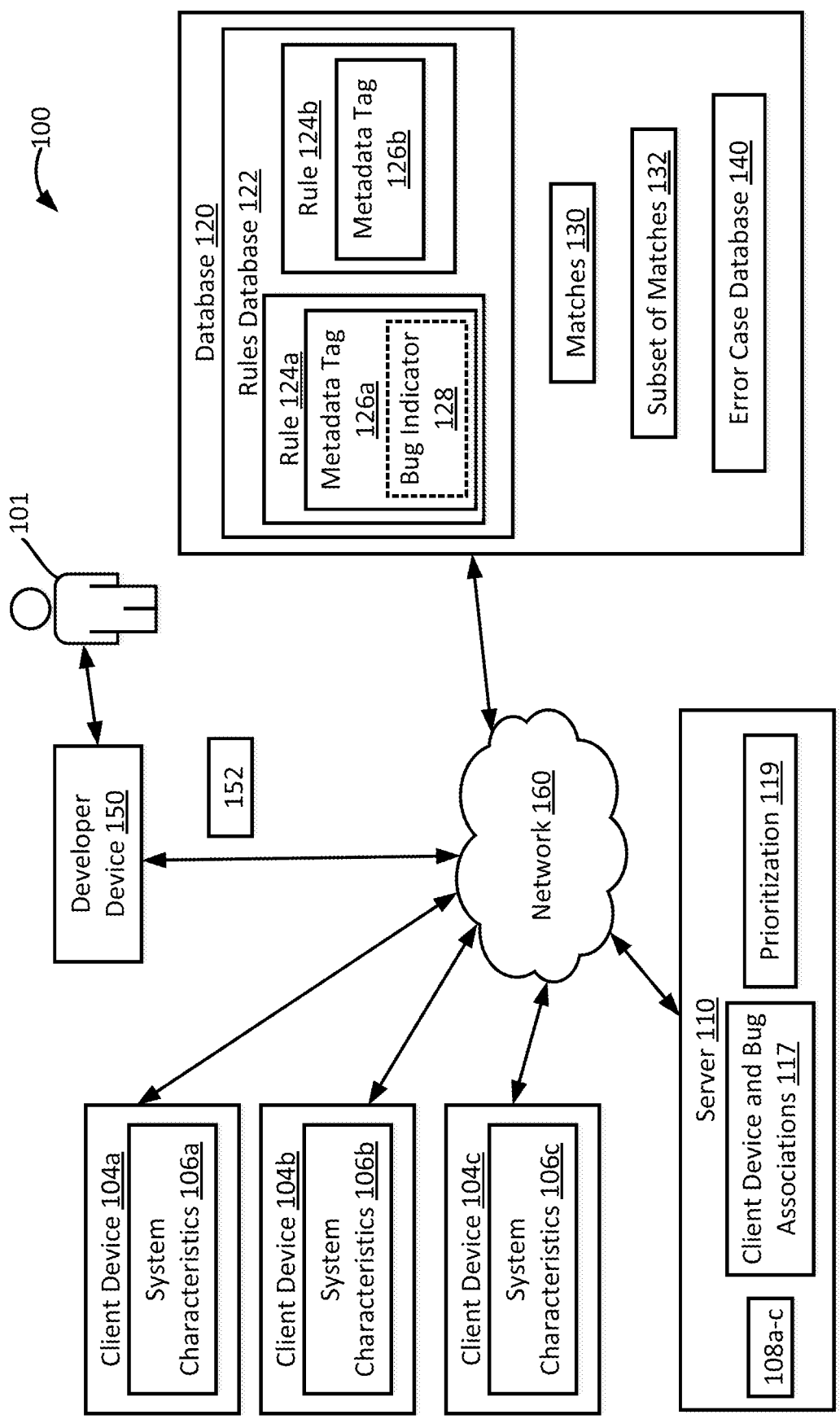
FIG. 1 is a block diagram of an example of a system for implementing bug prioritization determination according to some aspects of the present disclosure.

Bug prioritization often relies on users opening error cases for a software application. A software engineer then manually searches the software application for bugs to link the open error case to a particular bug. However, searching for bugs requires the software engineer to have knowledge about the error and generate a search query that can generate a match for the bug. Additionally, a bug may impact more users than have opened error cases. Thus, prioritizing bugs based on error cases may be inaccurate and inefficient. Software engineers may additionally use customer counts to determine the bug prioritization. However, customers can have varying numbers of installs on devices. For example, two customers may have fifteen installs of a first software application and a third customer may have thousands of installs of a second software application. Prioritizing a bug in the first software application because it affects two customers instead of a bug in the second software application would benefit fewer users than prioritizing the bug in the second software application. Because of these reasons, bug prioritization is often time-intensive, inefficient, and inaccurate.

Some examples of the present disclosure can overcome one or more of the abovementioned problems by providing a system that determines a prioritization for addressing bugs at a device-level and without relying on users to open error cases. The system can receive data files describing system characteristics, such as diagnostic information, from multiple client devices. Each data file can correspond to one of the multiple client devices. The system can compare each data file to predefined rules to identify one or more matches between the data file and the rules. A match can correspond to a match for an error message, or any other predefined characteristic of the client device. The system can filter the one or more matches to generate a subset of the one or more matches. The subset of matches can include matches of the one or more matches that are associated with metadata tags corresponding to bugs in the client devices. Therefore, only matches that correspond to a bug are included in the subset of matches. The system can then aggregate the subset of matches for the client devices to determine a number of the client devices that are associated with each bug. The system can determine a prioritization for addressing the bugs based on the number of the client devices associated with each bug. This bug prioritization determination can allow the system to accurately prioritize bugs that affect a greater number of client devices without excessive time and computational efforts from a software engineer or developer.

One particular example can involve a system receiving a data file of diagnostic information from four client devices. The system can compare each data file to predefined rules and determine each data file includes one match to a rule. The system can then filter the matches for rules that correspond to a bug occurring in the client devices into a subset of matches. The system can determine the match for three of the four client devices corresponds to a bug. The match that does not correspond to a bug can be discarded. Then, the system can aggregate the matches for the three client devices and determine that two of the client devices include a first bug and the third client devices includes a second bug. Therefore, the system can determine the first bug to have a higher prioritization than the second bug.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing bug prioritization determination according to some aspects of the present disclosure. The system 100 can include client devices 104a-c, a server 110, a database 120, and a developer device 150. Examples of the client devices 104a-c and the developer device 150 can include a desktop computer, a laptop, a mobile phone, server, etc. The client devices 104a-c, the server 110, the database 120, and the developer device 150 can communicate over a network 160, such as a local area network (LAN) or the Internet.

In some examples, the client devices 104a-c can be associated with one or more entities. For example, client devices 104a-b can be associated with a first entity and client device 104c can be associated with a second entity. For example, client devices 104a-b can be associated with customers of the first entity and client device 104c can be associated with a customer of the second entity. Each of the client devices 104a-c can execute software. System characteristics 106a-c that each describe system diagnostic information, such as central processing unit (CPU) usage, disk space, and the like, for the corresponding client device of the client devices 104a-c can be determined over a predefined length of time. For example, the client devices 104a-c may collect system diagnostic information over a twenty-four hour period. Then, the system characteristics 106a-c can be compiled into data files 108a-c (e.g., sosreports) and transmitted by the client devices 104a-c to the server 110.

The server 110 can receive the data files 108a-c from each client device and compare each of the data files 108a-c to rules 124a-b in a rules database 122 of the database 120. The rules 124a-b may be files, such as Python files, that specify criteria for a particular characteristic. For example, a rule may include an indicator that, when present in the data files 108a-c, corresponds to a particular error code. A data file matching the criteria of a rule can indicate that the client device associated with the data file includes or experiences the particular characteristic. Each of the data files 108a-c can be compared to the rules 124a-b separately from each other.

The server 110 can identify matches 130 between each of the data files 108a-c and the rules 124a-b. The server 110 can store the matches 130 in the database 120. Matches identified for each of the client device 104a-c may be stored separately from each other in the matches 130. The rules 124a-b may include metadata tags 126a-b that specify characteristics of the rules 124a-b. For example, metadata tag 126a can be associated with rule 124a and metadata tag 126b can be associated with rule 124b. Rules that correspond to a bug in software executing on a client device can include a bug indicator in the metadata tag for the rule. For example, metadata tag 126a can include a bug indicator 128 that specifies a bug associated with rule 124a. Thus, a data file that matches rule 124a can be understood to be associated with a client device that includes the bug indicated by the bug indicator 128. As one particular example, the server 110 can compare data file 108a for client device 104a with the rules 124a-b of the rules database 122. The server 110 can determine the data file 108a matches the rule 124a. Therefore, it can be understood that the bug associated with the bug indicator 128 is present in the client device 104a.

The server 110 can filter the matches 130 to generate a subset of matches 132. A subset of matches may be generated with respect to each of the client devices 104a-c. Each match in the subset of matches can be associated with a metadata tag that includes a bug indicator. Thus, only matches associated with bugs may be included in the subset of matches 130. For example, any of the matches 130 involving rule 124a can be included in the subset of matches 132 and any of the matches 130 associated with rule 124b can be excluded from the subset of matches 132.

In some examples, the server 110 can then aggregate the subset of matches 132 for the client devices 104a-c to determine a number of the client devices 104a-c associated with each bug. The server 110 may perform statistical analysis on the subset of matches 132 to determine the number of the client devices 104a-c associated with each bug. As a result, the server 110 may determine client device and bug associations 117. For example, the client device and bug associations 117 may indicate client device 104a is associated with the bug indicated by bug indicator 128.

The server 110 can determine a prioritization 119 for addressing the bugs based on the client device and bug associations 117 determined from the subset of matches 132. For example, a bug associated with a higher number of client devices may be assigned a higher prioritization in the prioritization 119 than a bug associated with a fewer number of client devices. As one particular example, client devices 104a-b can be associated with a first bug and client device 104c can be associated with a second bug. These associations can be indicated in the client device and bug associations 117. As a result, the server 110 can assign the first bug a higher priority in the prioritization 119 than the second bug.

In some examples, error cases may be open for various client devices. These error cases may be opened by users of the client devices 104a-c and may be stored in an error case database 140. An error case can indicate an issue that occurred during execution of software on a client device. Error cases may be used by software developers to determine an order for addressing bugs. For example, a bug associated with a higher number of error cases may be determined to have a higher priority than a bug associated with a lower number of error cases. However, for an accurate prioritization to be determined, the error cases should be accurately associated with bugs. To do this, the server 110 can determine an open error case associated with a client device is not associated with a bug. For example, the server 110 can determine an open error case for client device 104a is not associated with a bug. Based on aggregating the subset of matches 132, the server 110 can determine the bug is present in the client device 104a. As a result, the server 110 can associate the open error case for the client device 104a with the bug. This may reduce manual computation needed by a software developer to analyze an error case and determine which bug is occurring for the client device.

A number of open error cases may not reflect the number of client devices impacted by a bug. For example, an error case may be opened for client device 104a and not for client device 104b, even if both client devices 104a-b include the bug. Thus, the number of open error cases cannot be relied upon for determining the prioritization 119. For example, the error case database 140 may indicate a first bug is associated with a number of cases that is less than a number of cases for a second bug. The server 110 can then determine, based on the subset of matches 132, that a greater number of client devices include the first bug than the second bug. In response, the server 110 can assign a higher priority to the first bug than the second bug. As one particular example, the server 110 can determine, based on the error case database 140, that the first bug is associated with zero open error cases and the second bug is associated with one open error case for client device 104c. However, the server 110 can determine, from the subset of matches 132, that two client devices, client devices 104a-b, include the first bug and one client device, client device 104c, includes the second bug. In response, the server 110 can assign a higher priority to the first bug than the second bug.

The number of open error cases may reflect the number of client devices impacted by a bug. For example, the error case database 140 may indicate the first bug is associated with a number of cases that is less than a number of cases for the second bug. The server 110 can then determine, based on the subset of matches 132, that a fewer number of client devices include the first bug than the second bug. In response, the server 110 can assign a higher priority to the second bug than the first bug. As one particular example, the server 110 can determine, based on the error case database 140, that the first bug is associated with zero open error cases and the second bug is associated with one open error case for client device 104c. The server 110 can also determine, from the subset of matches 132, that zero client devices include the first bug and one client device, client device 104c, includes the second bug. In response, the server 110 can assign a higher priority to the second bug than the first bug.

The server 110 can receive a request 152 for the number of client devices associated with each bug. A software developer 101 may generate the request 152 at the developer device 150. The server 110 can then output the client device and bug associations 117 indicating the number of client devices associated with each bug to the developer device 150. Additionally, the server 110 can output the prioritization 119 to the developer device 150. As a result, the software developer 101 can determine which bugs impact a greater number of client devices and thus are to be addressed first.

FIG. 1 is illustrative and non-limiting. Other examples may include more components, fewer components, different components, or a different arrangement of the components shown in FIG. 1. For example, although the system 100 includes three client devices and one database in the example of FIG. 1, the system 100 may include a larger number of client devices and databases in other examples. Other examples may include a separate database for each of the rules database, match database, and error case database.

Figure 2:
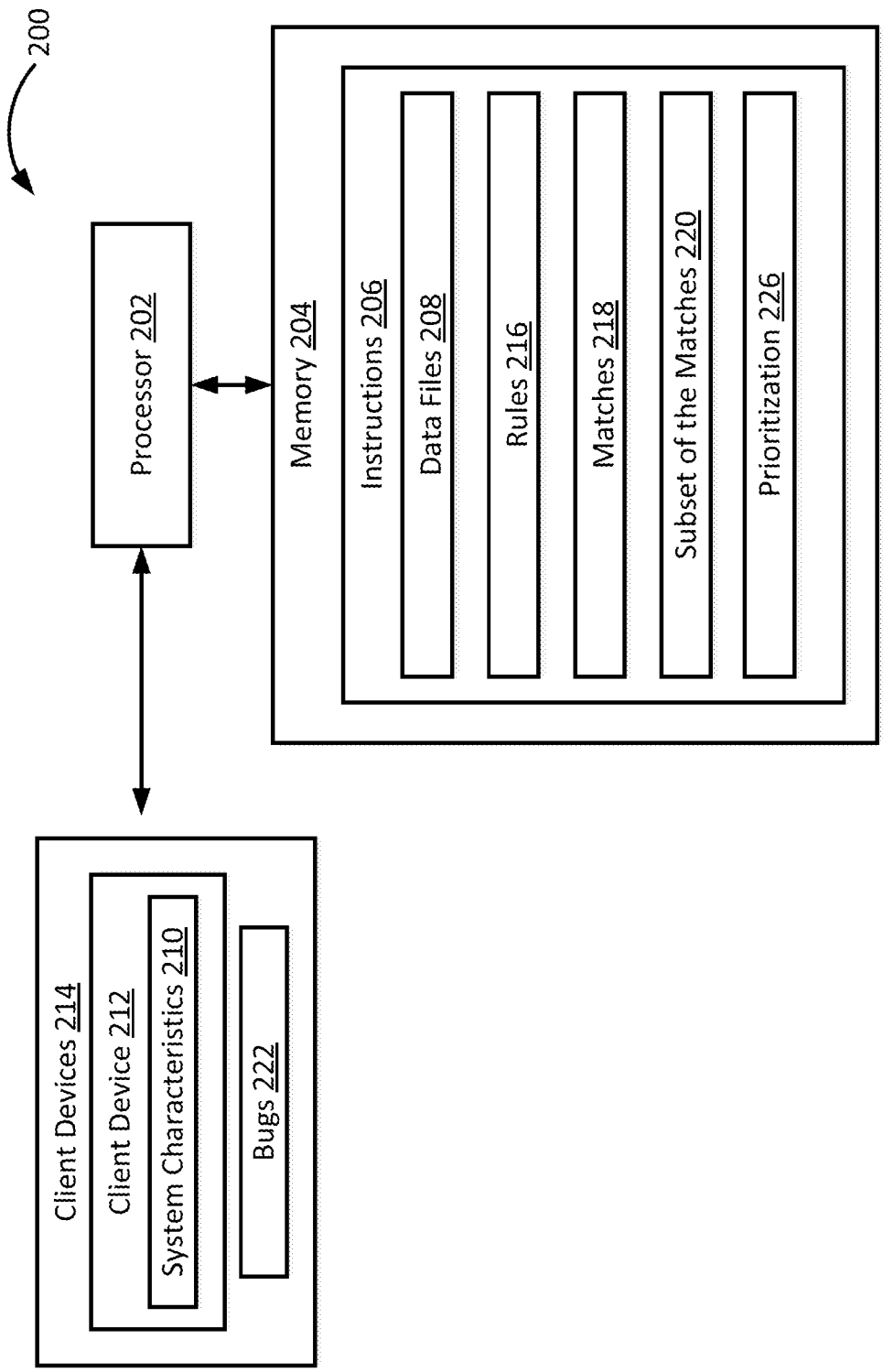
FIG. 2 is a block diagram of another example of a system for implementing bug prioritization determination according to some aspects of the present disclosure.

FIG. 2 is a block diagram of another example of a system 200 for implementing bug prioritization determination according to some aspects of the present disclosure. The system 200 includes a processor 202. The processor 202 may be part of a server, such as the server 110 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can receive a plurality of data files 208 that each describe system characteristics 210 for a client device 212 of a plurality of client devices 214. The processor 202 can compare each data file of the plurality of data files 208 to a plurality of rules 216 to identify one or more matches 218 between the data file and the plurality of rules 216. The processor 202 can filter the one or more matches 218 to generate a subset of the one or more matches 220 that are associated with metadata tags corresponding to one or more bugs 222 in the plurality of client devices 214. The processor 202 can aggregate the subset of the one or more matches 220 for the plurality of client devices 214 to determine a number of the plurality of client devices associated with each bug of the one or more bugs 222. The processor 202 can determine a prioritization 226 for addressing the one or more bugs 222 based on the number of the plurality of client devices associated with each bug of the one or more bugs 222. This may result in a more accurate and efficient prioritization for addressing bugs. Additionally, the prioritization may be determined in a reduced amount of time.

Figure 3:
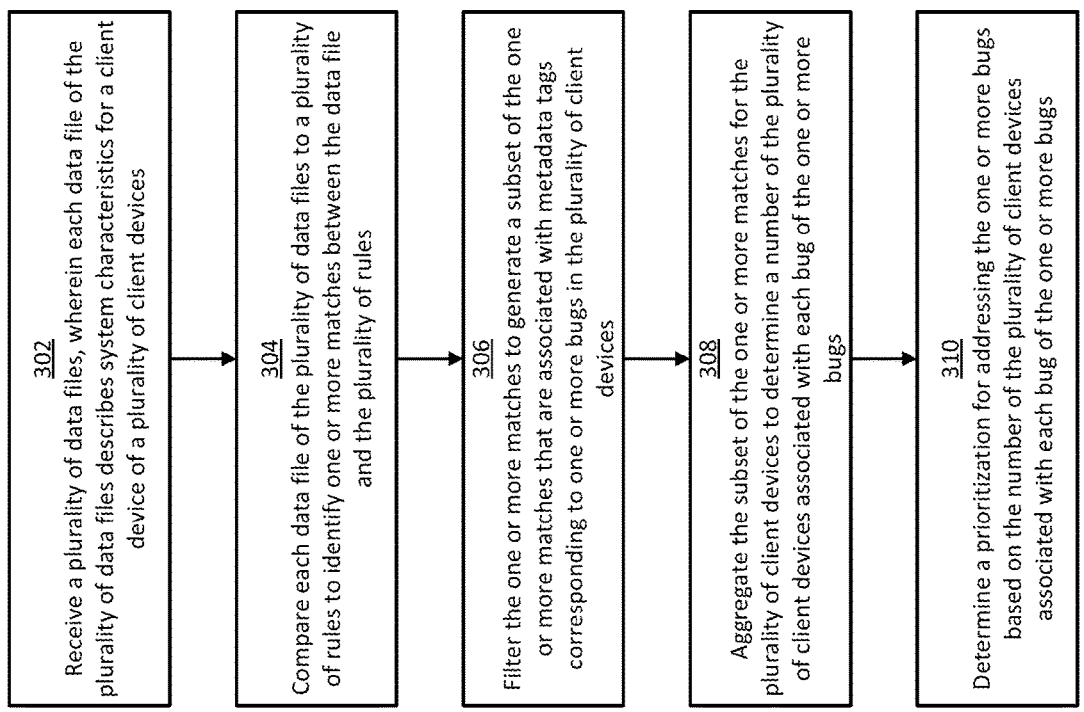
FIG. 3 is a flow chart of a process for bug prioritization determination for software on multiple systems according to some aspects of the present disclosure.

The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can receive a plurality of data files 208. Each data file of the plurality of data files 208 can describe system characteristics 210 for a client device 212 of a plurality of client devices 214. For example, the system characteristics 210 can include system diagnostic information for the client device 212 over a predefined period of time, such as twenty-four hours.

In block 304, the processor 202 can compare each data file of the plurality of data files 208 to a plurality of rules 216 to identify one or more matches 218 between the data file and the plurality of rules 216. Each rule can specify a pattern in a data file that corresponds to a particular outcome, such as an error message, at a client device.

In block 306, the processor 202 can filter the one or more matches 218 to generate a subset of the one or more matches 220 that are associated with metadata tags corresponding to one or more bugs 222 in the plurality of client devices 214. Thus, matches that indicate a client device includes a bug of the one or more bugs 222 can be included in the subset of the one or more matches 220.

In block 308, the processor 202 can aggregate the subset of the one or more matches 220 for the plurality of client devices 214 to determine a number of the plurality of client devices associated with each bug of the one or more bugs 222. The processor 202 may perform statistical analysis to determine the number of the client devices associated with each bug of the one or more bugs 222.

In block 310, the processor 202 can determine a prioritization 226 for addressing the one or more bugs 222 based on the number of the plurality of client devices associated with each bug of the one or more bugs 222. A bug associated with a higher number of the plurality of client devices 214 may be assigned a higher priority than a bug associated with a fewer number of the plurality of client devices 214. A software developer may then receive the prioritization 226 and address the one or more bugs 222 accordingly.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:
1. A system comprising:
a processor; and
a memory including instructions that are executable by the processor for causing the processor to:
 receive a plurality of data files, wherein each data file of the plurality of data files describes system characteristics for a client device of a plurality of client devices;
 compare each data file of the plurality of data files to a plurality of rules to identify one or more matches between the data file and the plurality of rules;
 filter the one or more matches to generate a subset of the one or more matches that are associated with one or more rules of the plurality of rules having metadata tags indicating one or more bugs in the plurality of client devices;

determine a bug of the one or more bugs is present in the client device based on the subset of the one or more matches;

aggregate the subset of the one or more matches for the plurality of client devices to determine a number of the plurality of client devices associated with each bug of the one or more bugs; and determine a prioritization for addressing the one or more bugs based on the number of the plurality of client devices associated with each bug of the one or more bugs.

2. The system of claim 1, wherein the memory further includes instructions that are executable by the processor for causing the processor to:

determine an open error case associated with the client device of the plurality of client devices is not associated with the bug of the one or more bugs;

and associate the open error case for the client device with the bug.

3. The system of claim 1, wherein the memory further includes instructions that are executable by the processor for causing the processor to:

determine a first bug of the one or more bugs is associated with fewer open error cases than a second bug of the one or more bugs for the plurality of client devices;

determine a greater number of the plurality of client devices include the first bug than the second bug based on the subset of the one or more matches; and in response to determining the greater number of the plurality of client devices include the first bug, assign a higher priority to the first bug than the second bug.

4. The system of claim 1, wherein the memory further includes instructions that are executable by the processor for causing the processor to:

determine a first bug of the one or more bugs is associated with fewer open error cases than a second bug of the one or more bugs for the plurality of client devices;

determine a fewer number of the plurality of client devices include the first bug than the second bug based on the subset of the one or more matches; and in response to determining the fewer number of the plurality of client devices include the first bug, assign a higher priority to the second bug than the first bug.

5. The system of claim 1, wherein the memory further includes instructions that are executable by the processor for causing the processor to:

receive a request for the number of the plurality of client devices associated with each bug of the one or more bugs; and output the number of the plurality of client devices associated with each bug of the one or more bugs and the prioritization for addressing the one or more bugs.

6. The system of claim 1, wherein the memory includes instructions that are executable by the processor for causing the processor to determine the number of the plurality of client devices associated with each bug of the one or more bugs by performing statistical analysis on the subset of the one or more matches.

7. The system of claim 1, wherein the system characteristics comprise system diagnostic information for the client device over a predefined length of time.

8. A computer-implemented method comprising:

receiving a plurality of data files, wherein each data file of the plurality of data files describes system characteristics for a client device of a plurality of client devices;

comparing each data file of the plurality of data files to a plurality of rules to identify one or more matches between the data file and the plurality of rules;

filtering the one or more matches to generate a subset of the one or more matches that are associated with one or more rules of the plurality of rules having metadata tags indicating one or more bugs in the plurality of client devices;

determining a bug of the one or more bugs is present in the client device based on the subset of the one or more matches;

aggregating the subset of the one or more matches for the plurality of client devices to determine a number of the plurality of client devices associated with each bug of the one or more bugs; and determining a prioritization for addressing the one or more bugs based on the number of the plurality of client devices associated with each bug of the one or more bugs.

9. The computer-implemented method of claim 8, further comprising:

determining an open error case associated with the client device of the plurality of client devices is not associated with the bug of the one or more bugs;

and associating the open error case for the client device with the bug.

10. The computer-implemented method of claim 8, further comprising:

determining a first bug of the one or more bugs is associated with fewer open error cases than a second bug of the one or more bugs for the plurality of client devices;

determining a greater number of the plurality of client devices include the first bug than the second bug based on the subset of the one or more matches; and in response to determining the greater number of the plurality of client devices include the first bug, assigning a higher priority to the first bug than the second bug.

11. The computer-implemented method of claim 8, further comprising:

determining a first bug of the one or more bugs is associated with fewer open error cases than a second bug of the one or more bugs for the plurality of client devices;

determining a fewer number of the plurality of client devices include the first bug than the second bug based on the subset of the one or more matches; and in response to determining the fewer number of the plurality of client devices include the first bug, assigning a higher priority to the second bug than the first bug.

12. The computer-implemented method of claim 8, further comprising:

receiving a request for the number of the plurality of client devices associated with each bug of the one or more bugs; and outputting the number of the plurality of client devices associated with each bug of the one or more bugs and the prioritization for addressing the one or more bugs.

13. The computer-implemented method of claim 8, wherein determining the number of the plurality of client devices associated with each bug of the one or more bugs comprises performing statistical analysis on the subset of the one or more matches.

14. The computer-implemented method of claim 8, wherein the system characteristics comprise system diagnostic information for the client device over a predefined length of time.

15. A non-transitory computer-readable medium comprising program code that is executable by a processor for causing the processor to:
  receive a plurality of data files, wherein each data file of the plurality of data files describes system characteristics for a client device of a plurality of client devices;
  compare each data file of the plurality of data files to a plurality of rules to identify one or more matches between the data file and the plurality of rules;
  filter the one or more matches to generate a subset of the one or more matches that are associated with one or more rules of the plurality of rules having metadata tags indicating one or more bugs in the plurality of client devices;
  determine a bug of the one or more bugs is present in the client device based on the subset of the one or more matches;
  aggregate the subset of the one or more matches for the plurality of client devices to determine a number of the plurality of client devices associated with each bug of the one or more bugs; and
  determine a prioritization for addressing the one or more bugs based on the number of the plurality of client devices associated with each bug of the one or more bugs.

16. The non-transitory computer-readable medium of claim 15, further comprising program code that is executable by a processor for causing the processor to:
  determine an open error case associated with the client device of the plurality of client devices is not associated with the bug of the one or more bugs; and
  associate the open error case for the client device with the bug.

17. The non-transitory computer-readable medium of claim 15, further comprising program code that is executable by a processor for causing the processor to:
  determine a first bug of the one or more bugs is associated with fewer open error cases than a second bug of the one or more bugs for the plurality of client devices;
  determine a greater number of the plurality of client devices include the first bug than the second bug based on the subset of the one or more matches; and
  in response to determining the greater number of the plurality of client devices include the first bug, assign a higher priority to the first bug than the second bug.

18. The non-transitory computer-readable medium of claim 15, further comprising program code that is executable by a processor for causing the processor to:
  determine a first bug of the one or more bugs is associated with fewer open error cases than a second bug of the one or more bugs for the plurality of client devices;
  determine a fewer number of the plurality of client devices include the first bug than the second bug based on the subset of the one or more matches; and
  in response to determining the fewer number of the plurality of client devices include the first bug, assign a higher priority to the second bug than the first bug.

19. The non-transitory computer-readable medium of claim 15, further comprising program code that is executable by a processor for causing the processor to:
  receive a request for the number of the plurality of client devices associated with each bug of the one or more bugs; and
  output the number of the plurality of client devices associated with each bug of the one or more bugs and the prioritization for addressing the one or more bugs.

20. The non-transitory computer-readable medium of claim 15, further comprising program code that is executable by a processor for causing the processor to determine the number of the plurality of client devices associated with each bug of the one or more bugs by performing statistical analysis on the subset of the one or more matches.

* * * * *